(12) United States Patent
Lee et al.

(10) Patent No.: US 11,573,295 B2
(45) Date of Patent: Feb. 7, 2023

(54) MEMS MIRROR DEVICE WITH REDUCED STATIC REFLECTION

(71) Applicant: Beijing Voyager Technology Co., Ltd., Beijing (CN)

(72) Inventors: Sae Won Lee, Mountain View, CA (US); Youmin Wang, Mountain View, CA (US); Qin Zhou, Mountain View, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 847 days.

(21) Appl. No.: 16/410,899

(22) Filed: May 13, 2019

(65) Prior Publication Data
US 2022/0244357 A1    Aug. 4, 2022

(51) Int. Cl.
| | |
|---|---|
| G02B 26/08 | (2006.01) |
| G01S 7/481 | (2006.01) |
| G02B 1/11 | (2015.01) |
| G02B 1/16 | (2015.01) |
| G01S 17/931 | (2020.01) |

(52) U.S. Cl.
CPC .......... *G01S 7/4817* (2013.01); *G01S 7/4813* (2013.01); *G01S 17/931* (2020.01); *G02B 1/11* (2013.01); *G02B 1/16* (2015.01); *G02B 26/0808* (2013.01); *G02B 26/0833* (2013.01)

(58) Field of Classification Search
CPC .. G01S 7/4817; G01S 7/4813; G02B 26/0833

USPC .......................................... 342/13; 359/212.1
See application file for complete search history.

(56) References Cited

U.S. PATENT DOCUMENTS

| | | | |
|---|---|---|---|
| 11,156,698 B2 | 10/2021 | Lee et al. | |
| 2009/0180167 A1 | 7/2009 | Tani et al. | |
| 2020/0363508 A1* | 11/2020 | Lee | G02B 27/0988 |
| 2020/0393545 A1* | 12/2020 | Shani | G01S 17/894 |

OTHER PUBLICATIONS

U.S. Appl. No. 16/410,924, Non-Final Office Action, dated Mar. 16, 2021, 10 pages.
U.S. Appl. No. 16/410,924, Notice of Allowance, dated Jul. 9, 2021, 8 pages.

* cited by examiner

*Primary Examiner* — Euncha P Cherry
(74) *Attorney, Agent, or Firm* — Kilpatrick Townsend & Stockton LLP (57) ABSTRACT

Methods and systems for using a MEMS mirror for steering a LiDAR beam and for minimizing statically emitted light from a LiDAR system are disclosed. A LiDAR system includes a light source that emits a light beam directed at a MEMS device. The MEMS device includes a manipulable mirror that reflects the emitted light beam in a scanning pattern. The MEMS device also includes a substrate positioned adjacent to and at least partially surrounding the mirror. An attenuation layer is disposed on a top surface of the substrate and is configured to attenuate light reflected by the substrate.

20 Claims, 10 Drawing Sheets

MEMS MIRROR DEVICE WITH REDUCED STATIC REFLECTION

CROSS-REFERENCES TO OTHER APPLICATIONS

This application is related to the following concurrently filed and commonly assigned U.S. nonprovisional patent application, U.S. patent application Ser. No. 16/410,924, for "MEMS MIRROR DEVICE HAVING A STABILIZATION RING AND REDUCED STATIC REFLECTION," filed on May 13, 2019, which is hereby incorporated by reference in its entirety for all purposes.

BACKGROUND

Modern vehicles are often fitted with a suite of environment detection sensors that are designed to detect objects and landscape features around the vehicle in real-time that can be used as a foundation for many present and emerging technologies such as lane change assistance, collision avoidance, and autonomous driving capabilities. Some commonly used sensing systems include optical sensors (e.g., infra-red, cameras, etc.), radio detection and ranging (RADAR) for detecting presence, direction, distance, and speeds of other vehicles or objects, magnetometers (e.g., passive sensing of large ferrous objects, such as trucks, cars, or rail cars), and light detection and ranging (LiDAR).

LiDAR systems typically use a pulsed light source and a light detection system to estimate distances to environmental features (e.g., vehicles, structures, etc.). In some systems, the light source can emit a beam that is steered in a repeating scanning pattern across a region of interest to form a collection of points that are dynamically and continuously updated in real-time, forming a "point cloud." The point cloud data can be used to estimate, for example, a distance, dimension, and location of an object relative to the LiDAR system, often with very high fidelity (e.g., within 5 cm).

In some applications the beam is steered by reflecting the beam off of a manipulable mirror that is formed as a part of a micro-electromechanical system (MEMS) device. Thus, by controlling an orientation of the mirror a single beam can be steered in a scanning pattern to generate the "point cloud". The beam may have a diameter that is larger than the mirror and the outer edges (e.g., tail portion) of the beam may be reflected off a substrate that is positioned adjacent to the mirror creating regions of statically reflected light that does not move with the mirror. To meet LiDAR performance and safety requirements new LiDAR systems need to reduce the intensity of the statically reflected light.

BRIEF SUMMARY

In some embodiments a LiDAR system comprises a light source positioned within the LiDAR system that emits a light beam directed at a MEMS device. In various embodiments the MEMS device includes a manipulable mirror that reflects the emitted light beam through an aperture of the LiDAR system and steers the reflected light beam in a scanning pattern outside of the LiDAR system. A substrate is positioned adjacent to and at least partially surrounding the mirror and an attenuation layer is disposed on a top surface of the substrate that attenuates an intensity of a reflection of the emitted light beam from the attenuation layer that exits the aperture. A receiver receives light reflected off an object outside of the LiDAR system.

In some embodiments the light beam includes a center portion that is reflected by the manipulable mirror and a tail portion that surrounds the center portion and is reflected by the attenuation layer. In various embodiments the attenuation layer comprises an anti-reflective coating. In some embodiments the mirror has an oval shape. In various embodiments the attenuation layer comprises a diffraction grating. In some embodiments the attenuation layer comprises a diffuse reflection coating. In various embodiments the attenuation layer comprises an absorbing coating.

In some embodiments a micro-electromechanical system (MEMS) package comprises a manipulable mirror having a reflective surface and a substrate positioned adjacent to and at least partially surrounding the mirror. An attenuation layer is disposed on the substrate and is configured to attenuate an intensity of reflected light. In various embodiments The MEMS package is configured to receive a light beam including a center portion and a tail portion that surrounds the center portion. The center portion of the light beam is reflected by the mirror and the attenuation layer attenuates an intensity of the tail portion that is reflected by the attenuation layer.

In some embodiments the attenuation layer comprises an anti-reflective coating. In various embodiments the mirror has an oval shape. In some embodiments the attenuation layer comprises a diffraction grating. In various embodiments the attenuation layer comprises a diffuse reflection coating. In some embodiments the attenuation layer comprises an absorbing coating.

In some embodiments a method of using a micro-electromechanical system (MEMS) package comprises receiving a light beam through a window of the MEMS package, wherein the light beam has a center portion and a tail portion that surrounds the center portion. A reflection of the center portion of the light beam is steered by reflecting the center portion of the light beam off a mirror, wherein the mirror is positioned adjacent to a substrate. A reflection of the tail portion of the light beam that is reflected off the substrate is attenuated using an attenuation layer disposed on a top surface of the substrate.

In some embodiments the attenuation layer comprises an anti-reflective coating. In various embodiments the mirror has an oval shape. In some embodiments the attenuation layer comprises a diffraction grating. In various embodiments the attenuation layer comprises a diffuse reflection coating. In various embodiments the attenuation layer comprises an absorbing coating.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

BRIEF DESCRIPTION OF THE DRAWINGS

The detailed description is set forth with reference to the accompanying figures.

DETAILED DESCRIPTION

Aspects of the present disclosure relate generally to object and environment detection systems, and more particularly to LiDAR systems, according to certain embodiments.

In the following description, various examples of microelectromechanical systems (MEMS) mirror devices that can be used for LiDAR-based systems are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

Figure 1:
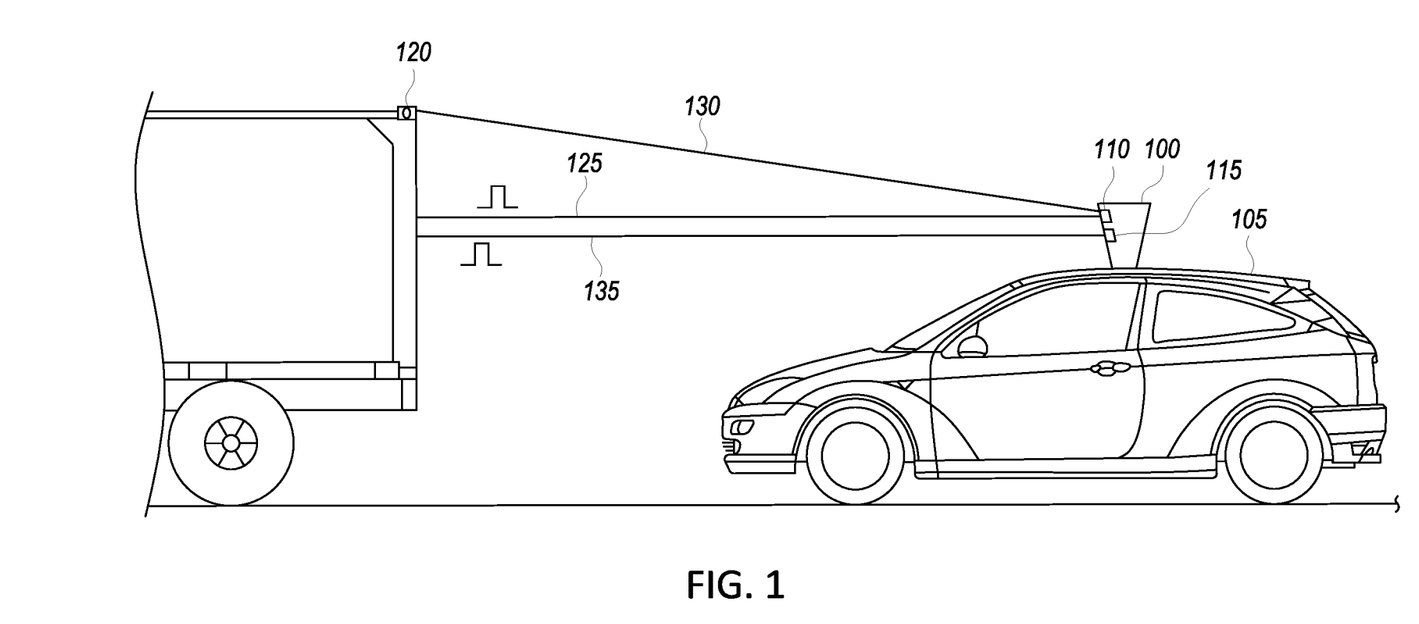
FIG. 1 illustrates an autonomous driving vehicle, according to certain embodiments of the invention.

The following high level summary is intended to provide a basic understanding of some of the novel innovations depicted in the figures and presented in the corresponding descriptions provided below. Aspects of the invention relate to a LiDAR-based system. As an illustrative example, FIG. 1 depicts a LiDAR-based system 100 mounted on a vehicle 105 (e.g., automobile, unmanned aerial vehicle, etc.). LiDAR system 100 may use a pulsed light LiDAR source 110 (e.g., focused light, lasers, etc.) and detection system 115 to receive reflected light 135 that is used to detect external objects and environmental features (e.g., vehicle 120, structures, etc.), determine a vehicle's position, speed, and direction relative to the detected external objects, and in some cases may be used to determine a probability of collision, avoidance strategies, or otherwise facilitate certain remedial actions.

LiDAR source 110 may employ a light steering system, described in more detail below, that includes a mirror that steers a pulsed light source that is transmitted from LiDAR system 100 as an emitted LiDAR beam 125. In some embodiments the mirror is manipulable and sequentially steers emitted LiDAR beam 125 in a scan and repeat pattern across a large area to detect obstacles around the vehicle and to determine distances between the obstacles and the vehicle. The mirror can be part of a MEMS device that enables the mirror to be rotated about one or more axes (e.g., tilted), as described in more detail below.

LiDAR source 110 may generate an internal initial beam having a diameter that is larger than the mirror diameter and an outer portion of the beam (referred to herein as the tail) may be reflected off of a substrate that is adjacent the mirror creating one or more static light beams 130 that are emitted from LiDAR system 100. When emitted LiDAR beam 125 aligns with static light beam 130, regions of relatively high light intensity result. These regions of high intensity may be used to set a maximum light intensity level for LiDAR system 100 which is required to remain below a certain intensity level required by applicable LiDAR safety standards. An attenuation layer (e.g., 260 in FIG. 2) may be applied to the substrate to attenuate the intensity of static light beams 130 so the intensity of emitted LiDAR beam 125 can be increased to optimize LiDAR system 100 performance, as described in more detail herein. In other embodiments a stabilization ring (e.g., 915 in FIG. 9) may be positioned around the mirror and may include an attenuation layer to attenuate the intensity of static light beams.

In order to better appreciate the features and aspects of MEMS devices having an attenuation layer according to the present disclosure, further context for the disclosure is provided in the following section by discussing one particular implementation of a MEMS device having a substrate with an attenuation layer according to some embodiments of the present disclosure. These embodiments are for example only and other embodiments can be employed in other systems such as, but not limited to optical diagnostic equipment, optical manufacturing equipment (e.g., laser direct structuring) or any other system that steers light.

Example LiDAR System Implementing an Attenuation Layer

Figure 2:
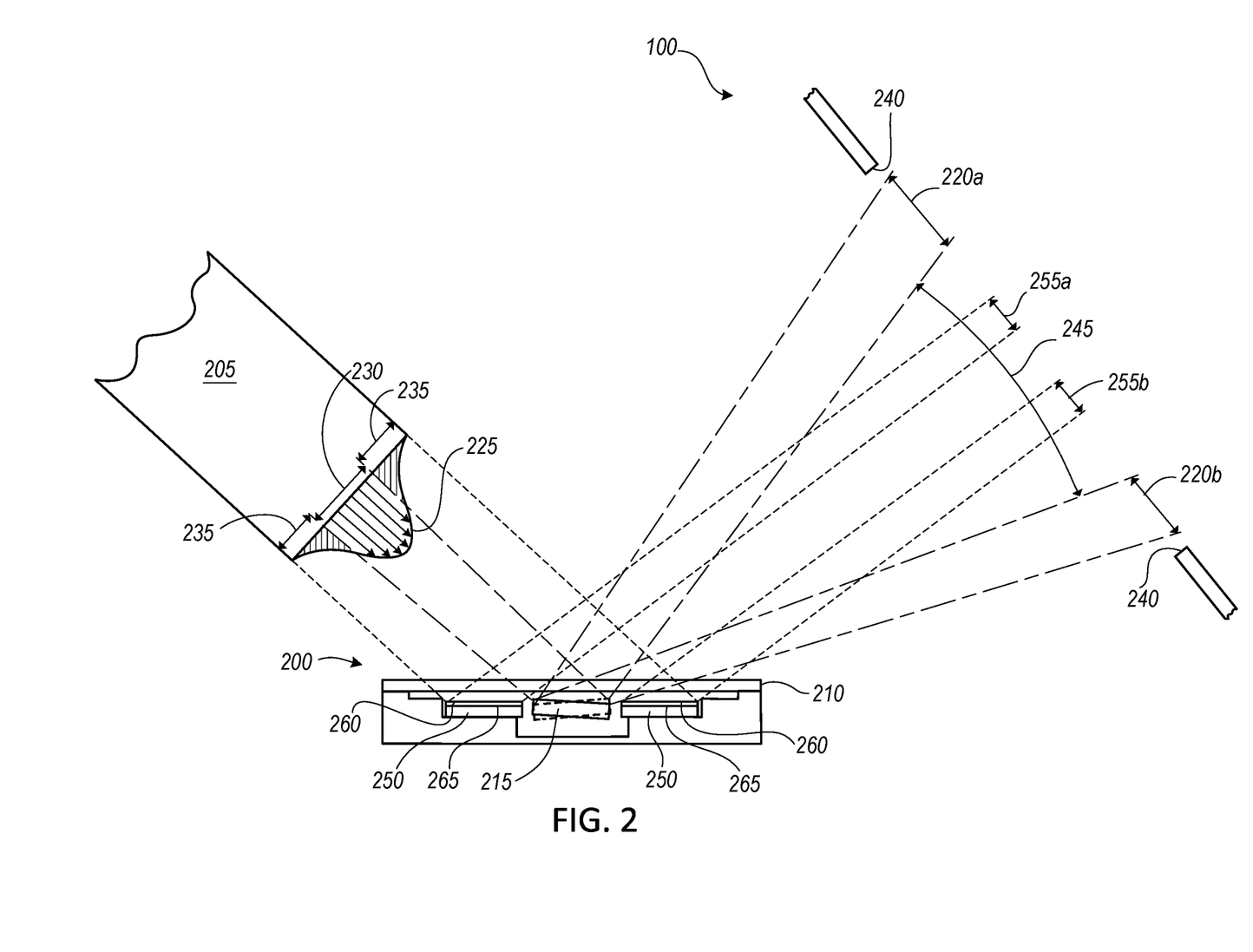
FIG. 2 depicts a simplified cross-section of a MEMS package that can be used in the LiDAR system shown in FIG. 1, according to certain embodiments of the invention.

FIG. 2 depicts a simplified illustrative cross-section of a MEMS package 200 that can be used in LiDAR-based system 100 (see FIG. 1). As shown in FIG. 2, MEMS package 200 can be used to form a portion of a LiDAR source, such as source 110 illustrated in FIG. 1. A LiDAR beam generator (not shown in FIG. 2) directs a generated LiDAR beam 205 through a transparent panel 210 of MEMS package 200 and on to a MEMS mirror 215. Mirror 215 can be tilted (as shown by dashed lines) to steer an emitted LiDAR beam 220a, 220b in a scanning pattern to detect objects, such as vehicle 120 (see FIG. 1).

Generated LiDAR beam 205 can have an intensity profile 225 that may be a Gaussian intensity profile in some embodiments. As defined herein a center portion 230 of generated LiDAR beam 205 can be the portion that impinges mirror 215, and a tail portion 235 of the generated LiDAR beam can be the portion that surrounds center portion 230. As one of skill in the art will appreciate, light beams generally have cylindrical or elliptical cross-sections, thus as tail portion 235 surrounds center portion 230, the tail portion is therefore shown on either side of the center portion in FIG. 2.

Center portion 230 is reflected off mirror 215 and is emitted from aperture 240 of LiDAR system 100 as emitted LiDAR beam 220a, 220b. Angle 245 illustrates that emitted LiDAR beam 220a, 220b can be moved within aperture 240 by tilting mirror 215. As further shown, generated LiDAR beam 205 has a diameter that is greater than a diameter of mirror 215 so tail portions 235 of the generated LiDAR beam impinge substrate 250 that is positioned adjacent mirror 215 and is reflected off the substrate through aperture 240 generating static light beams 255a, 255b. As shown in FIG. 2, static light beams 255a, 255b, do not move when mirror 215 is tilted and are therefore stationary.

When emitted LiDAR beam 220a, 220b aligns with either static light beam 255a, 255b, a region of relatively high light intensity can result as the intensity of the two coincident beams are additive. To reduce the light intensity in the regions of static light beams 255a, 255b, an attenuation layer 260 can be disposed on a top surface 265 of substrate 250. Attenuation layer 260 can be of myriad forms, as described in more detail herein, and operates to reduce the intensity of static light beams 255a, 255b that exit aperture 240. In some embodiments, attenuation layer 260 can be an anti-reflective coating (ARC).

In some embodiments the ARC consists of a transparent thin film structure with alternating layers of contrasting refractive index that are deposited on top surface 265 of substrate 250. The thicknesses of each layer are selected to produce destructive interference in the beams reflected from the interfaces between the layers, and constructive interference in the corresponding transmitted beams. As appreciated by one of skill in the art the particular coatings and the thicknesses thereof depend on the wavelengths that are to be attenuated. In one embodiment the ARC can include a layer of silicon-dioxide.

Figure 3:
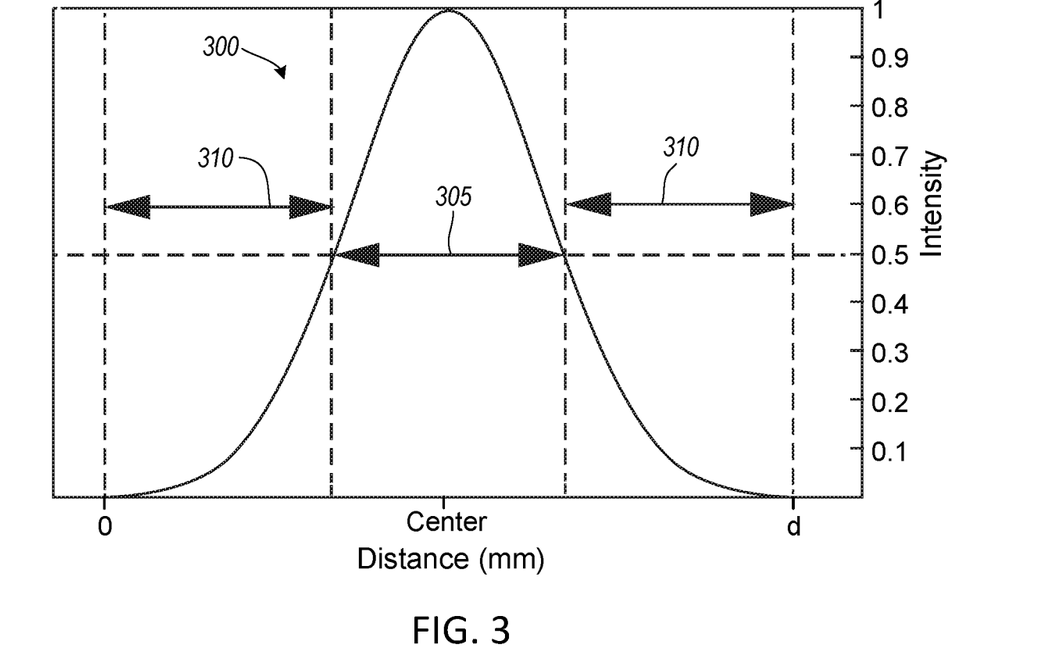
FIG. 3 illustrates a illustrates a Gaussian intensity graph for a LiDAR beam that can be used in the LiDAR system shown in FIG. 1, according to certain embodiments of the invention.

FIG. 3 illustrates a Gaussian intensity graph 300 for a generated LiDAR beam such as, for example, generated LiDAR beam 205 illustrated in FIG. 2. As shown in FIG. 3 a generated LiDAR beam can have a Gaussian distribution where normalized intensity is on the vertical axis and distance (e.g., dimensions of the beam) is across the horizontal axis. FIG. 3 can be viewed as a cross-section through the beam where the cross-section is performed longitudinally down a center of the cylindrical or elliptical beam. More specifically, on the horizontal axis the beam edge starts at 0 millimeters and extends to the other side of the beam designated ("d") here for diameter of the beam. The center of the beam is also marked on graph 300 where the peak normalized intensity occurs. As discussed above, the generated LiDAR beam can be divided into two portions with center portion 305 having the highest intensity and being directed at and reflected by a steering mirror, such as mirror 215 in FIG. 2. Surrounding center portion 305 is a tail portion 310 (shown on either side of center portion 305) that has a lower relative intensity and impinges a substrate that surrounds the mirror, such as substrate 250 in FIG. 2.

In some embodiments center portion 305 is equivalent to a full width at half maximum (FWHM) location as known to those of skill in the art, where a diameter of center portion is located at 50 percent of the relative intensity, as shown in FIG. 3. However, any other division location can be selected for center portion 305 and tail portion 310. Other intensity distributions than Gaussian can be used without departing from this disclosure.

Figure 4:
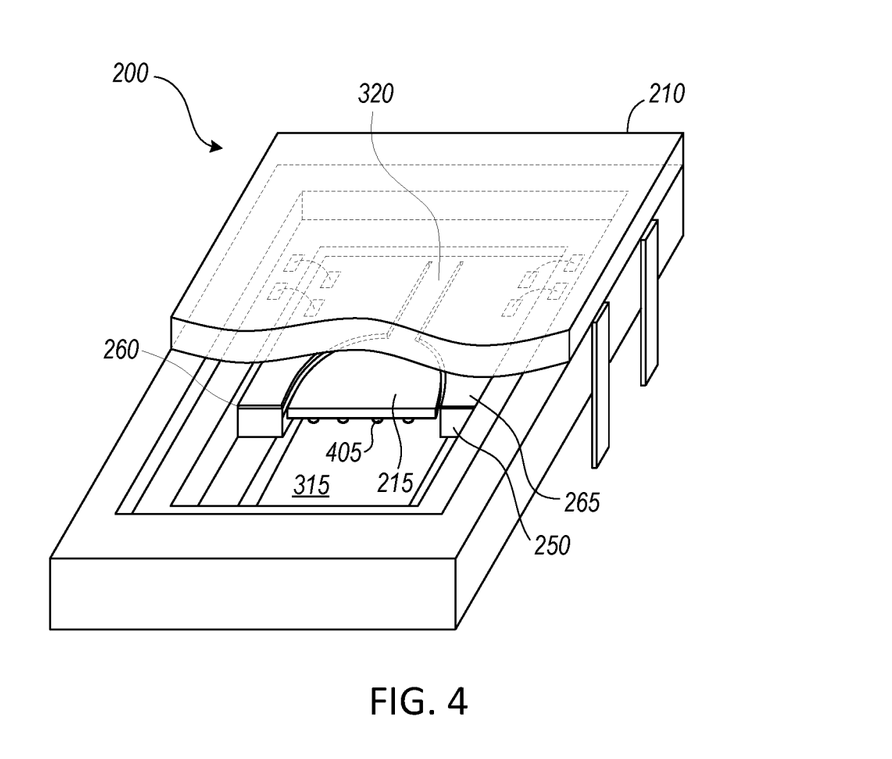
FIG. 4 illustrates a simplified isometric view of the MEMS package shown in FIG. 2, according to certain embodiments of the invention.

FIG. 4 illustrates a simplified partial isometric view of MEMS package 200 shown in FIG. 2. As shown in FIG. 4, portions of transparent panel 210 and the MEMS device have been cut away for clarity. As described above, the MEMS device can include a substrate 250 that supports mirror 215 over cavity 315. Mirror 215 can be coupled to substrate 250 with one or more flexible beams 320. Flexible beams 320 can include a comb drive or other structure (not shown in FIG. 4) that enables mirror 215 to be moved (e.g., rotated). Mirror 215 can be positioned over cavity 315 allowing for the mirror to be tilted along at least two orthogonal axes without making contact with substrate 250 or other portions of package 200.

In some embodiments, attenuation layer 260 is disposed on top surface 265 of substrate 250 and is used to attenuate light reflected by the substrate. As discussed above, in some embodiments attenuation layer 260 can be an ARC. In one embodiment substrate 250 is made from silicon and attenuation layer 260 comprises one or more layers of silicon-dioxide. However, in other embodiments attenuation layer 260 can comprise other materials and/or features as described in more detail below.

In some embodiments one or more stiffening ribs 405 can be positioned on a back surface of mirror 215 to provide the mirror with increased rigidity. Stiffening ribs 405 can be oriented across the entire back surface in one direction, in orthogonal directions or in any other suitable orientation.

Figure 5:
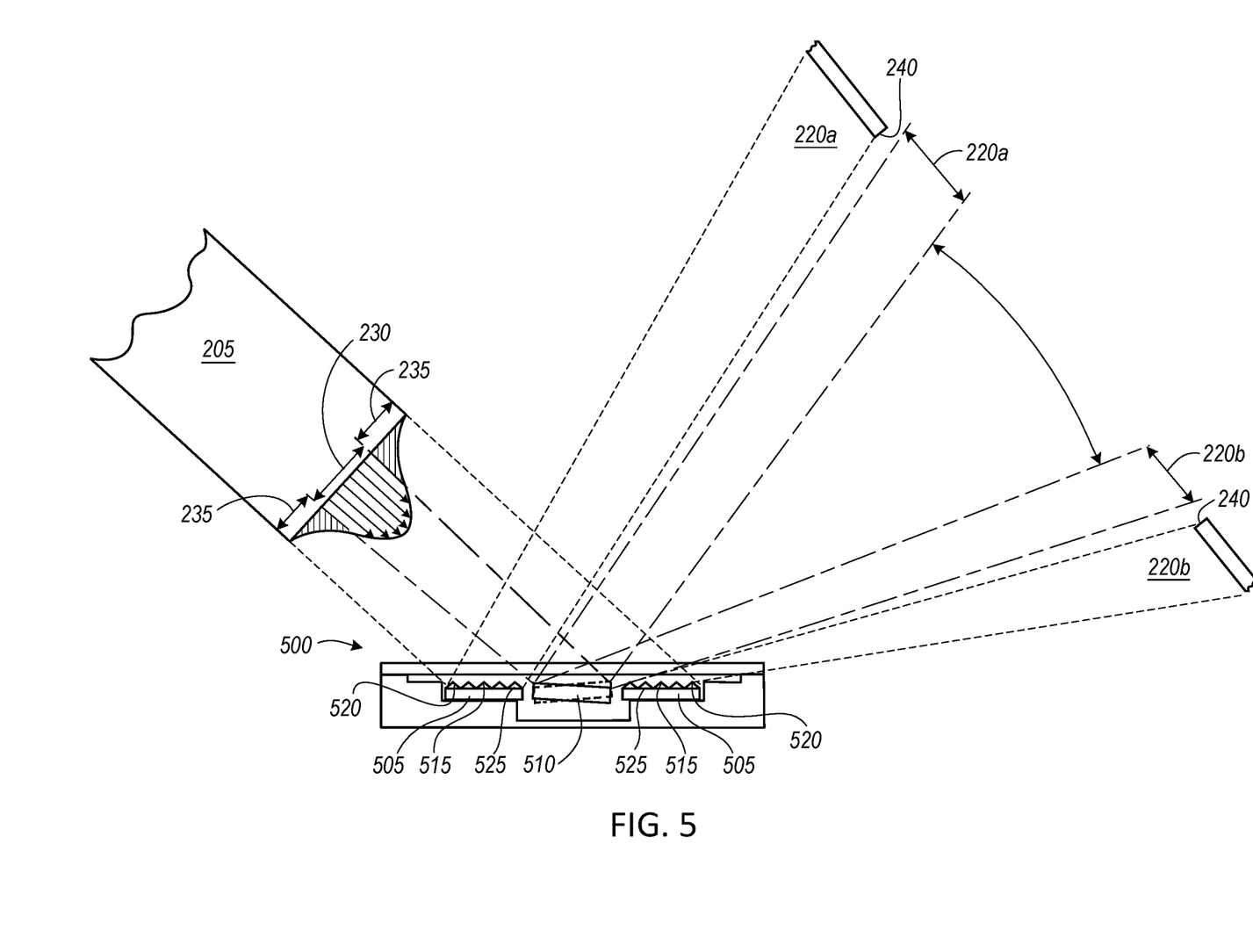
FIG. 5 depicts a simplified cross-section of a MEMS package that can be used in the LiDAR system shown in FIG. 1, according to certain embodiments of the invention.

FIG. 5 illustrates a simplified cross-sectional view of a MEMS package 500 that includes a substrate 505 and a mirror 510 that are similar to MEMS package 200, substrate 250 and mirror 215, respectively, that illustrated in FIGS. 2 and 4, however in this embodiment substrate 505 includes an attenuation layer 515 that includes a diffraction grating 520. Diffraction grating 520 redirects light reflected off substrate 505 so the reflected static light does not exit aperture 240 or such that a reduced amount of static light exits the aperture, as described in more detail below. In some embodiments diffraction grating 520 can be below the wavelength (i.e., subwavelength), at the wavelength or above the wavelength of generated LiDAR beam 205.

As shown in FIG. 5, generated LiDAR beam 205 includes a center portion 230 of that impinges mirror 510, and a tail portion 235 that surrounds the center portion and impinges substrate 505. Center portion 230 is reflected off mirror 510 and is emitted from aperture 240 of LiDAR system 100 (see FIG. 1) as emitted LiDAR beam 220a, 220b. Tail portion 235 of generated LiDAR beam 205 impinges substrate 505 that is positioned adjacent mirror 510 and is redirected by diffraction grating 520 so that static light beams 255a, 255b cannot exit aperture 240 and are retained within LiDAR system 100 (see FIG. 1). Diffraction grating 520 has a periodic structure that splits and diffracts the impinging LiDAR beam tail portion 235 into several beams travelling in different directions. In this particular embodiment diffraction grating 520 is arranged such that none of static light beams 255a, 255b exit aperture 240, however in other embodiments portions of the diffracted beams may exit aperture 240, although with a relatively low intensity due to the scattering effect of diffraction grating 520.

In some embodiments diffraction grating 520 can be a sub-wavelength diffraction grating in which etching is performed vertically in top surface 525 of substrate 505. In other embodiments diffraction grating 520 can be a blazed grating, as known to those of skill in the art, that has a triangular, sawtooth-shaped cross section, forming a step structure. In various embodiments diffraction grating 520 can be either etched or can be a separate material disposed on top surface 525 of substrate 505.

Figure 6:
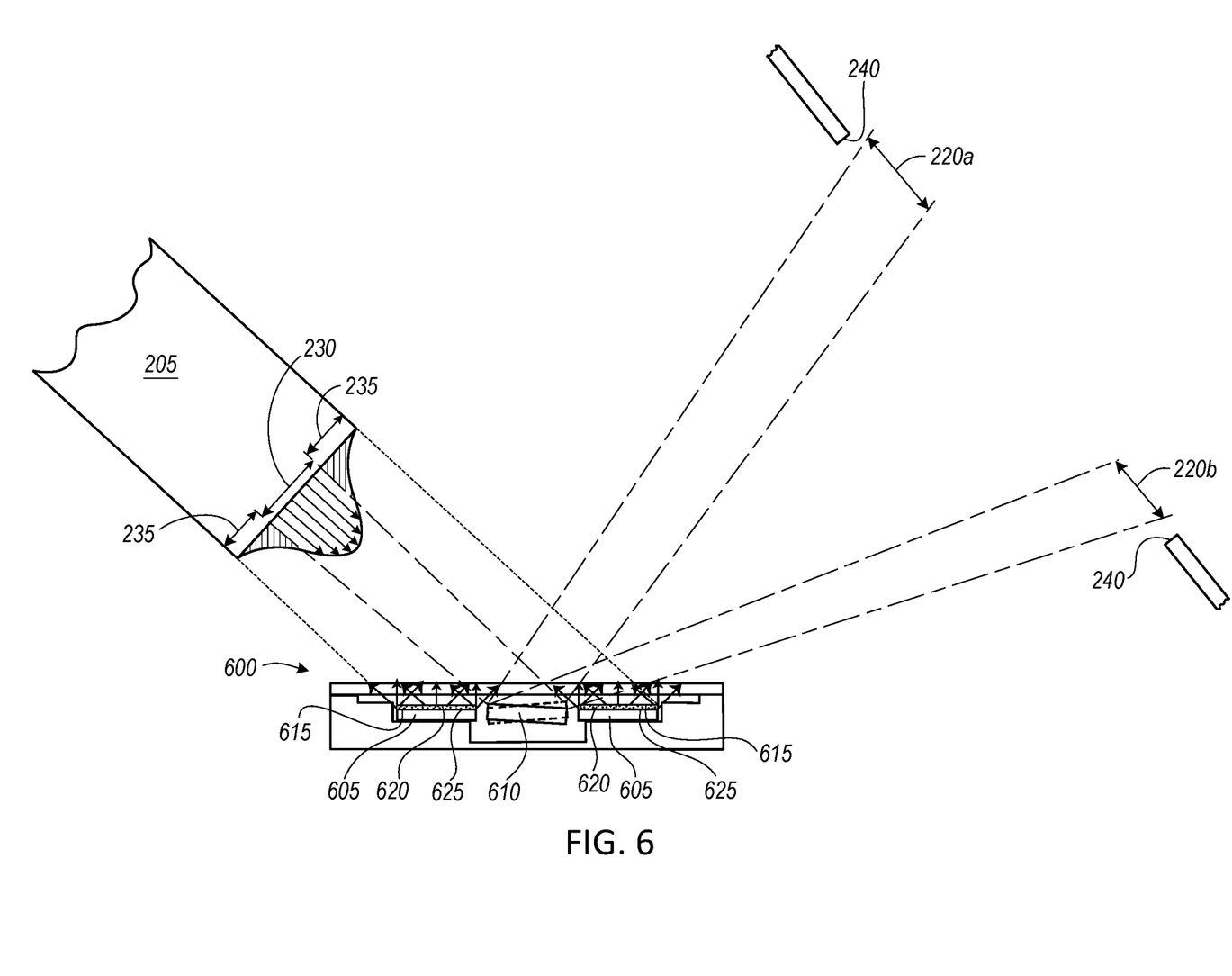
FIG. 6 depicts a simplified cross-section of a MEMS package that can be used in the LiDAR system shown in FIG. 1, according to certain embodiments of the invention.

FIG. 6 illustrates a simplified cross-sectional view of a MEMS package 600 that includes a substrate 605 and a mirror 610 that are similar to MEMS package 200, substrate 250 and mirror 215, respectively, that illustrated in FIGS. 2 and 4, however in this embodiment substrate 605 includes an attenuation layer 615 that includes a diffuse reflection coating 620. Diffuse reflection coating 620 scatters LiDAR beam tail portion 235 at many angles which results in a reduction in intensity of statically reflected light that is emitted from aperture 240.

In some embodiments diffuse reflection coating 620 is an ideal diffuse reflecting surface that exhibits near Lambertian reflection such that there is substantially equal luminance when viewed from all directions lying in the half-space adjacent to the surface. In other embodiments the reflective properties of diffuse reflection coating 620 may not be Lambertian and there may be regions having somewhat higher intensity, and regions having somewhat lower intensity. In some embodiments diffuse reflection coating 620 can be formed from a non-absorbing powder such as plaster, while in other embodiments it can be made from fibers, such as for example paper, or from a polycrystalline material such as, for example, white marble. In other embodiments a reactive ion etching process can be performed on top surface 625 of substrate 605 and can form a grass-like pattern that functions as a diffuse reflection coating.

Figure 7:
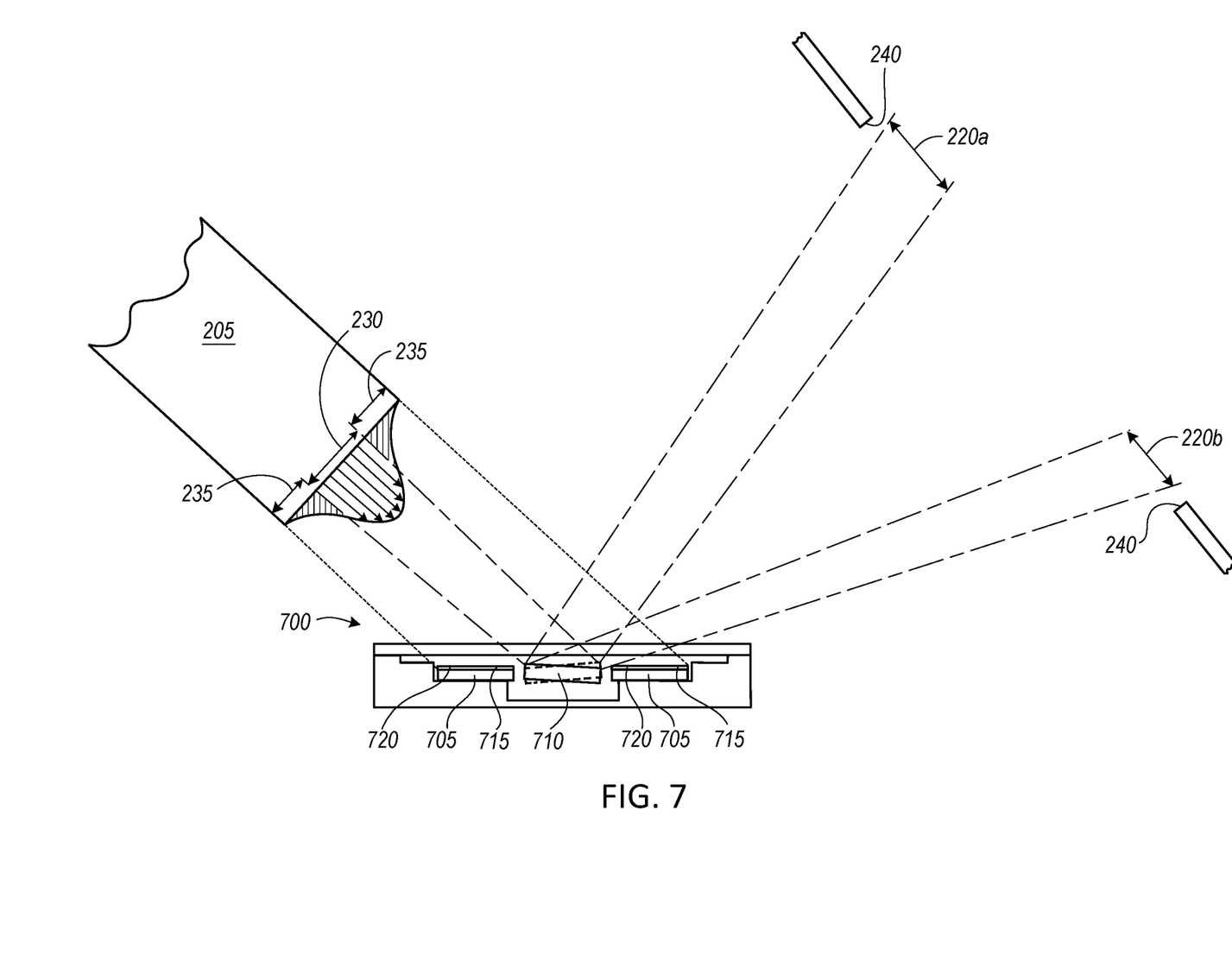
FIG. 7 depicts a simplified cross-section of a MEMS package that can be used in the LiDAR system shown in FIG. 1, according to certain embodiments of the invention.

FIG. 7 illustrates a simplified cross-sectional view of a MEMS package 700 that includes a substrate 705 and a mirror 710 that are similar to MEMS package 200, substrate 250 and mirror 215, respectively, that illustrated in FIGS. 2 and 4, however in this embodiment substrate 705 includes an attenuation layer 715 that includes an absorbing coating 720. Absorbing coating 720 absorbs LiDAR beam tail portion 235 and reflects none or very little light, instead absorbing the light and converting it to thermal energy. In some embodiments absorbing coating 720 can be formed from any material that absorbs the particular wavelengths of tail portion 235. In one embodiment, absorbing coating 720 is formed from vertically aligned carbon nanotubes, a carbon powder or other light absorbing material.

Figure 8:
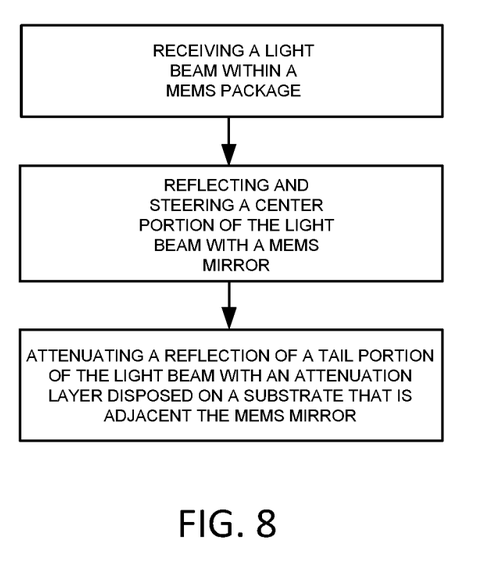
FIG. 8 depicts a method of using the MEMS package shown in FIG. 1, according to certain embodiments of the invention.

FIG. 8 illustrates steps associated with a method 800 of steering a center portion of a LiDAR beam with a MEMS mirror and attenuating a reflection of a tail portion of the LiDAR beam with an attenuation layer.

In step 805 a light beam enters a MEMS package. In some embodiment the MEMS package may have a transparent cover that the light beam travels through.

In step 810 a center portion of the light beam may be reflected and steered using a MEMS mirror that is formed a portion of the MEMS package. In some embodiments the MEMS package may include a silicon substrate that includes a mirror surrounded by portions of the substrate. While the mirror may be arranged to reflect and steer the center portion of the beam the tail portion (e.g., outer edge) of the beam may have a larger diameter than the mirror and may impinge the adjacent substrate.

An attenuation layer may be disposed on the adjacent substrate to attenuate the reflected beam so that the intensity of any emitted static light beams from the LiDAR system are minimized. Myriad structures and materials can be used for the attenuation layer, as described above. In some embodiments the attenuation layer can be an anti-reflective coating, a diffraction grating, a diffuse reflection layer, an absorptive layer or any other material or structure that attenuates the intensity of light reflected off the substrate and out of the LiDAR system aperture.

It will be appreciated that method 800 is illustrative and that variations and modifications are possible. Steps described as sequential may be executed in parallel, order of steps may be varied, and steps may be modified, combined, added or omitted.

Example LiDAR System Implementing Mirror Stabilization Ring

Figure 9:
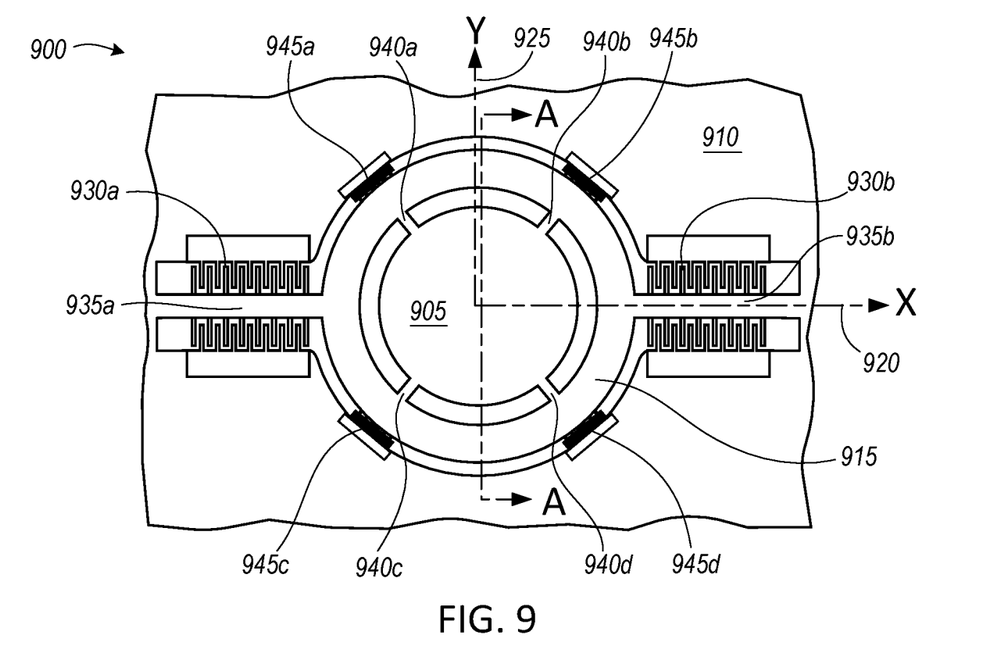
FIG. 9 illustrates a simplified plan view of a portion of a MEMS mirror structure having a stabilization ring, according to certain embodiments of the invention.

FIG. 9 illustrates a simplified plan view of a portion of a MEMS mirror structure 900. As shown in FIG. 9, MEMS mirror structure 900 may have a mirror 905, and substrate 910 that are similar to MEMS mirror 215 and substrate 250 illustrated in FIGS. 2 and 4, however in this embodiment instead of the MEMS mirror being surrounded by a substrate, MEMS mirror 905 is surrounded by a mirror stabilization ring 915 and substrate 910 is positioned adjacent to and around the mirror stabilization ring. In some embodiments mirror stabilization ring 915 may reduce the distortion of mirror 905 when the mirror is rotated, as described in more detail below.

In this embodiment, mirror 905 can be rotated about an X-axis 920 and a Y-axes 925 using one or more comb drives, as are known in the art. More specifically, in this particular embodiment, comb drives 930a, 930b are attached to flexible beams 935a, 935b, respectively and can apply a rotational force along the flexible beams when they are engaged. The rotational force on flexible beams 935a, 935b imparts a rotational force on mirror stabilization ring 915 and causes it to rotate about X-axis 920.

Stabilization ring 915 is attached to mirror 905 with tie bars 940a . . . 940d that impart forces on mirror 905 causing the mirror to rotate along with the stabilization ring. In some embodiments tie bars 940a . . . 940d can be sized and positioned such that they impart evenly distributed forces on mirror 905 so when comb drives 930a, 930b are engaged, mirror 905 distortion is minimal, or at least substantially less than if the mirror was attached directly to and moved only by flexible beams 935a, 935b as illustrated in FIG. 4. As one of skill in the art will appreciate, it is generally desirable to minimize the distortion of a mirror to maintain the integrity and collimation of the reflected beam. In some embodiments tie bars 940a . . . 940d are uniformly distributed around mirror such that each tie bar has an equal distance between adjacent tie bars.

Similar to the X-axis operation, stabilization ring x performs a similar function when rotating mirror x about Y-axis x. Comb drives 945a . . . 945d are engaged to rotate stabilization ring 915 about Y-axis 925. When stabilization ring 915 rotates, tie bars 940a . . . 940d impart forces on mirror 905 causing the mirror to rotate about Y-axis 925.

Due to the rigid structural linking of stabilization ring 915 and mirror 905 via tie bars 940a . . . 940d, during rotation the stabilization ring and mirror are substantially "in-phase" with each other such that the stabilization ring and the mirror are positioned at substantially similar angles, as explained in more detail below.

Figure 10:
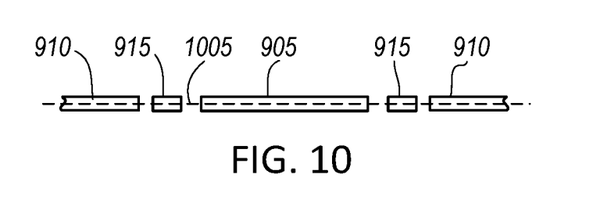
FIG. 10 depicts a simplified cross-section the MEMS structure shown in FIG. 9, according to certain embodiments of the invention.

FIG. 10 illustrates section A-A through mirror structure 900 of FIG. 9. As shown in FIG. 10, mirror 905 and stabilization ring 915 are at a neutral state where the mirror is not actively being rotated. A neutral axis 1005 shows that mirror 905, stabilization ring 915 and substrate 910 are all in alignment along neutral axis 1005.

Figure 11:
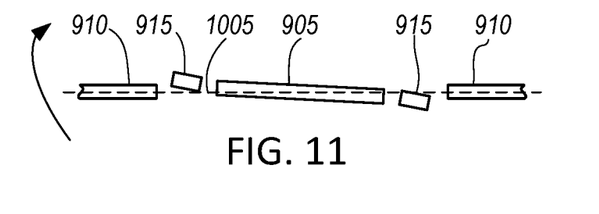
FIG. 11 depicts a simplified cross-section the MEMS structure shown in FIG. 9, according to certain embodiments of the invention.

FIG. 11 illustrates section A-A through mirror structure 900 of FIG. 9 when 905 is being rotated clockwise about X axis 920. As shown in FIG. 11, stabilization ring 915 is rotated in a clockwise direction and due to flexing in tie bars 940a . . . 940d mirror 905 is also rotating in a clockwise direction but due to flexing in the tie bars the angle of the mirror is "lagging" the angle of the stabilization ring. More specifically, stabilization ring 915 and mirror 905 can be said to be "in-phase" with each other although the mirror is at a slightly smaller incline than the stabilization ring.

As one of skill in the art will appreciate, when generated LiDAR beam 205 (see FIG. 2) impinges mirror structure 900, center portion 230 of the generated LiDAR beam impinges mirror 905, and tail portion 235 of generated LiDAR beam impinges stabilization ring 915. Because stabilization ring 915 moves with mirror 905, there will no longer be any static beams emitted from LiDAR system 100 (see FIG. 1) as there were in previous embodiments described in FIGS. 1-2. More specifically, stabilization ring 915 and mirror 905 moves synchronously so that tail portion 235 (see FIG. 2) of beam is reflected in a similar direction as center portion 230 of the beam.

In some embodiments there is enough difference between an orientation of mirror 905 and stabilization ring 915 that any light reflected off the stabilization ring is not aligned with light reflected from the mirror so there is no additive intensity effect of the tail portion. In other embodiments tie bars 940a . . . 940d may be rigid enough such that the stabilization ring is aligned reasonably close with the mirror and there may be an additive intensity effect of the tail portion adding to the center portion of the beam resulting in regions of high intensity. Therefore, in some embodiments it may be beneficial to apply an attenuation layer to stabilization ring, such as described above in FIGS. 1-8 to attenuate the intensity of any light reflected off the stabilization ring.

Figure 12:
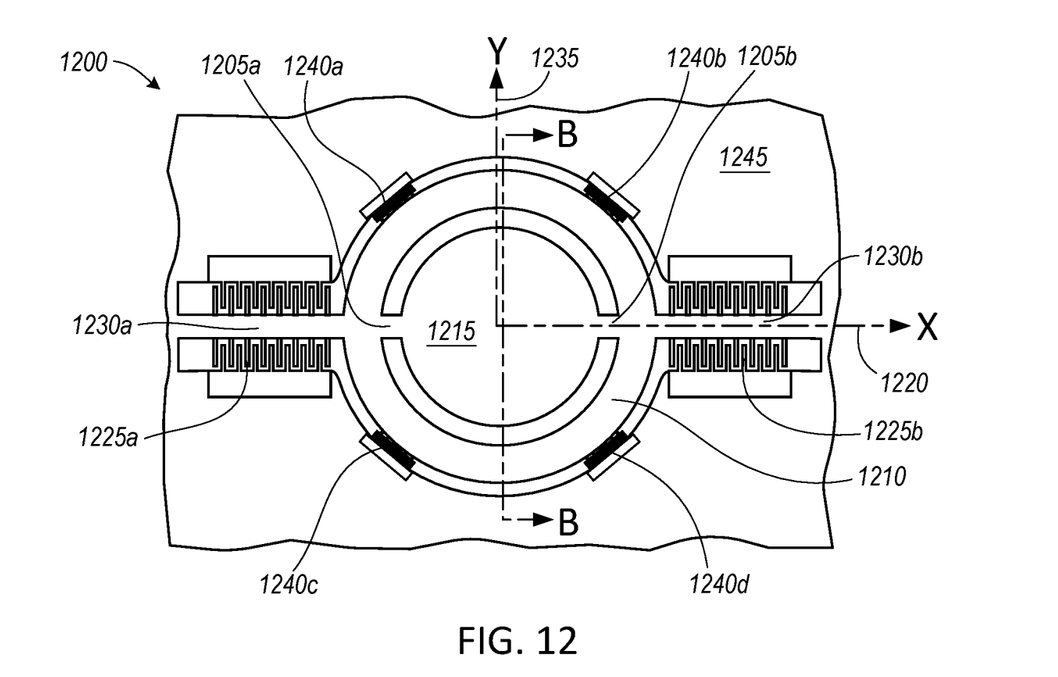
FIG. 12 illustrates a simplified plan view of a portion of a MEMS mirror structure having a stabilization ring, according to certain embodiments of the invention.

FIG. 12 illustrates a simplified plan view of a portion of a MEMS mirror structure 1200. As shown in FIG. 12, MEMS mirror structure 1200 may be similar to MEMS mirror structure 900 illustrated in FIGS. 9-11, however in this embodiment tie bars 1205a, 1205b that couple stabilization ring 1210 to mirror 1215 have been reduced from four to two and have been aligned with X-axis 1220 such that mirror 1215 and stabilization ring 1210 move out of phase with each other, as explained in more detail below.

Similar to the embodiment illustrated in FIGS. 9-12, comb drives 1225a, 1225b are attached to flexible beams 1230a, 1230b, respectively and can apply a rotational force along the flexible beams when they are engaged. The rotational force on flexible beams 1230a, 1230b imparts a rotational force on mirror stabilization ring 1210 and causes it to rotate about X-axis 1220. Stabilization ring 1210 is attached to mirror 1215 with tie bars 1205a, 1205b that impart forces on mirror 1215 causing the mirror to rotate. In this embodiment tie bars 1205a, 1205b are positioned only along X-axis 1220 such that they allow mirror 1215 to move out of phase with stabilization ring 1210, at specific frequencies as described in more detail below.

Similar to the X-axis operation, stabilization ring 1210 performs a similar function when rotating mirror 1215 about Y-axis 1235. Comb drives 1240a . . . 1240d are engaged to rotate stabilization ring 1210 about Y-axis 1235. When stabilization ring 1210 rotates, tie bars 1205a, 1205b impart forces on mirror 1215 causing the mirror to rotate about Y-axis 1235.

Due to the relatively more flexible linking of stabilization ring 1210 and mirror 1215 via tie bars 1205a, 1205b, during rotation at specific frequencies the stabilization ring and mirror are substantially "out of phase" with each other such that the stabilization ring and the mirror are positioned at opposing angles of inclination, as explained in more detail below.

Figure 13:
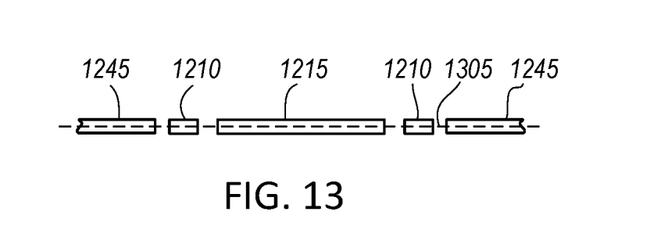
FIG. 13 depicts a simplified cross-section the MEMS structure shown in FIG. 9, according to certain embodiments of the invention.

FIG. 13 illustrates section B-B through mirror structure 1200 of FIG. 12. As shown in FIG. 13, mirror 1215 and stabilization ring 1210 are at a neutral state where the mirror is not actively being rotated. A neutral axis 1305 shows that mirror 1215, stabilization ring 1210 and substrate 1245 are all in alignment along neutral axis 1305.

Figure 14:
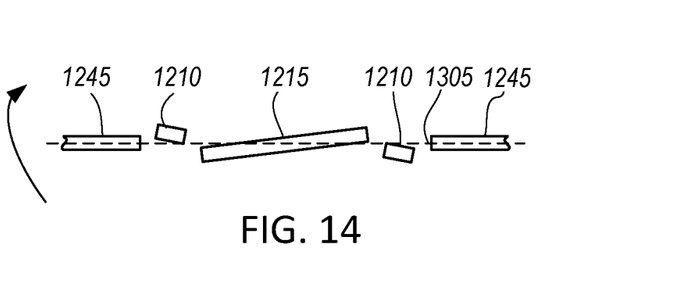
FIG. 14 depicts a simplified cross-section the MEMS structure shown in FIG. 9, according to certain embodiments of the invention.

FIG. 14 illustrates section B-B through mirror structure 1200 of FIG. 12 when mirror 1215 is being rotated clockwise about X-axis 1220. As shown in FIG. 14, stabilization ring 1210 is rotated in a clockwise direction and due predominantly to flexing in tie bars 1205a, 1205b the angle of the mirror significantly lags the stabilization ring such that the mirror has an opposing angle of inclination and is rotated counter-clockwise. More specifically, stabilization ring 1210 and mirror 1215 can be said to be "out of phase" with each other as they are oriented at opposing angles.

As one of skill in the art will appreciate, when generated LiDAR beam 205 (see FIG. 2) impinges mirror structure 1200, center portion 230 of the generated LiDAR beam impinges mirror 1215, and tail portion 235 of generated LiDAR beam impinges stabilization ring 1210. Because stabilization ring 1210 moves with mirror 1215, there will no longer be any static beams emitted from LiDAR system 100 (see FIG. 1) as there were in previous embodiments described in FIGS. 1-2. More specifically, stabilization ring 1210 and mirror 1215 move synchronously so that tail portion 235 (see FIG. 2) of beam is reflected in a similar direction as center portion 230 of the beam.

In this embodiment there is a significant difference between an orientation of mirror 1215 and an orientation of stabilization ring 1210 such that any light that is reflected off the stabilization ring is not aligned with light reflected from mirror except for an occasional brief cross-over point when the angles of the mirror and the stabilization ring are equal as they transition between clockwise and counter-clockwise orientations. Thus, there is only a brief period where the reflection of the tail portion is aligned with a reflection of the center portion creating an increased intensity in the emitted beam. To minimize reflections of the tail portion that exit the aperture it may be beneficial to apply an attenuation layer to stabilization ring 1210, such as described above in FIGS. 1-8 to attenuate the intensity of any light reflected off the stabilization ring.

Although MEMS mirror devices have been described herein as one particular configuration, embodiments of the invention are suitable for use with a multiplicity of configurations of MEMS mirror devices that steer light for LiDAR applications. For example, any MEMS mirror device described herein can use an oval shaped or other shape of mirror, rather than the circular shaped mirrors that have been described.

Figure 15:
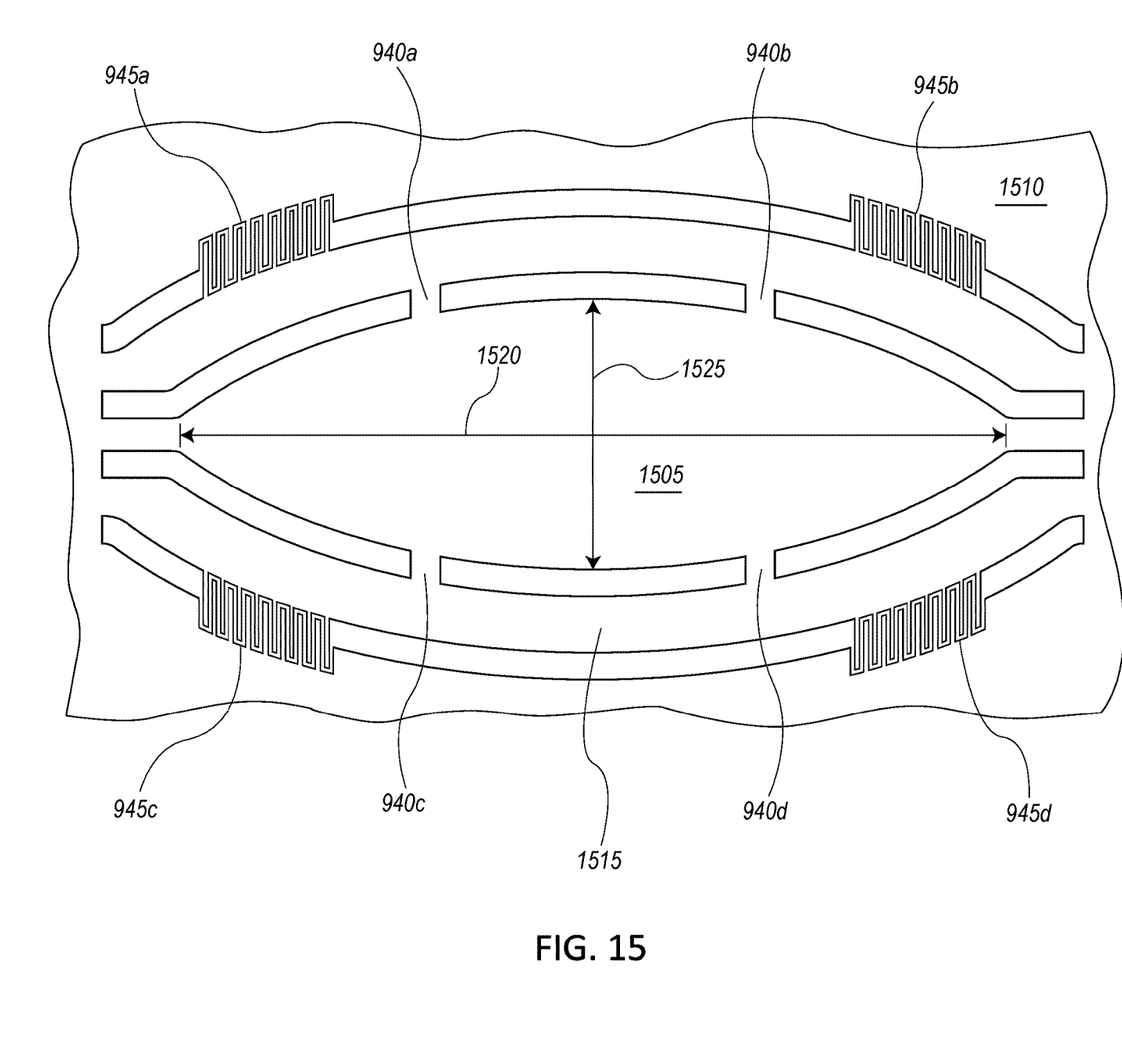
FIG. 15 illustrates a simplified plan view of a portion of an oval MEMS mirror structure having a stabilization ring, according to certain embodiments of the invention.

FIG. 15 illustrates a simplified plan view of a portion of a MEMS mirror structure 1500. As shown in FIG. 15, MEMS mirror structure 1500 may have a mirror 1505, and substrate 1510 that are similar to MEMS mirror 905 and substrate 910 illustrated in FIGS. 9-11, however in this embodiment instead of the MEMS mirror and stabilization ring having a circular shape, MEMS mirror 1505 has an oval shape and is surrounded by an oval stabilization ring 1515. In some embodiments mirror 1505 can have a length 1520 that is between 5 and 30 millimeters and in other embodiments is between 10 to 15 millimeters. In further embodiments mirror 1515 can have a width that is between 0.5 and 5 millimeters and in other embodiments is between 1 and 2 millimeters. In some embodiments an aspect ratio of mirror's 1515 length to width can be between 2:1 and 20:1 and in other embodiments between 10:1 and 5:1.

Similar to mirror 900, mirror 1505 can be rotated about X and Y axes using one or more comb drives 945a-945d. Stabilization ring 1515 is attached to mirror 1505 with tie bars 940a . . . 940d that impart forces on mirror 1505 causing the mirror to rotate along with the stabilization ring. In some embodiments tie bars 940a . . . 940d can be sized and positioned such that they impart evenly distributed forces on mirror 1505 so when comb drives 945a-945d are engaged such that mirror 1505 distortion is minimal, as described above.

In further embodiments one or more raised regions referred to as ribs can be judiciously positioned across a back side of mirror 1505 to increase a rigidity of the mirror so it deforms less when forces are imparted on it by comb drives 945a-945d. Ribs can be used to increase rigidity with minimal increase in a mass if mirror 1505. As further described above in FIGS. 9-11, mirror 1500 can operate in-phase with stabilization ring 1515, while in other embodiments a different configuration of tie bars can be used (not shown in FIG. 15) enabling mirror 1500 to operate out of phase with stabilization ring 1515.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. A LiDAR system comprising:
    a light source positioned within the LiDAR system that emits a light beam directed at a MEMS device, wherein the MEMS device includes:
        a manipulable mirror that reflects the emitted light beam through an aperture of the LiDAR system and steers the reflected light beam in a scanning pattern outside of the LiDAR system;
        a substrate positioned adjacent to and at least partially surrounding the mirror;
        an attenuation system comprising a transparent thin film structure with alternating layers having a contrasting refractive index disposed on a top surface of the substrate that attenuates an intensity of a reflection of the emitted light beam from the attenuation system that exits the aperture; and
    a receiver that receives light reflected off an object outside of the LiDAR system.

2. The LiDAR system of claim 1 wherein the light beam includes a center portion that is reflected by the manipulable mirror and a tail portion that surrounds the center portion and is reflected by the attenuation system.

3. The LiDAR system of claim 1 wherein the attenuation system comprises an anti-reflective coating.

4. The LiDAR system of claim 1 wherein the mirror has an oval shape.

5. The LiDAR system of claim 1 wherein the attenuation system comprises a diffraction grating.

6. The LiDAR system of claim 1 wherein the attenuation system comprises a diffuse reflection coating.

7. The LiDAR system of claim 1 wherein the attenuation system comprises an absorbing coating.

8. A micro-electromechanical system (MEMS) package comprising:
    a manipulable mirror having a reflective surface;
    a substrate positioned adjacent to and at least partially surrounding the mirror; and
    an attenuation system comprising a transparent thin film structure with alternating layers having a contrasting refractive index disposed on the substrate and configured to attenuate an intensity of reflected light.

9. The MEMS package of claim 8 configured to receive a light beam including a center portion and a tail portion that surrounds the center portion;
    wherein the center portion of the light beam is reflected by the mirror; and
    wherein the attenuation system attenuates an intensity of the tail portion that is reflected by the attenuation system.

10. The MEMS package of claim 8 wherein the attenuation system comprises an anti-reflective coating.

11. The MEMS package of claim 8 wherein the mirror has an oval shape.

12. The MEMS package of claim 8 wherein the attenuation system comprises a diffraction grating.

13. The MEMS package of claim 8 wherein the attenuation system comprises a diffuse reflection coating.

14. The MEMS package of claim 8 wherein the attenuation system comprises an absorbing coating.

15. A method of using a micro-electromechanical system (MEMS) package comprising:
    receiving a light beam through a window of the MEMS package, wherein the light beam has a center portion and a tail portion that surrounds the center portion;
    steering a reflection of the center portion of the light beam by reflecting the center portion of the light beam off a mirror, wherein the mirror is positioned adjacent to a substrate; and
    attenuating a reflection of the tail portion of the light beam that is reflected off the substrate using an attenuation system comprising a transparent thin film structure with alternating layers having a contrasting refractive index disposed on a top surface of the substrate.

16. The method of claim 15 wherein the attenuation system comprises an anti-reflective coating.

17. The method of claim 15 wherein the mirror has an oval shape.

18. The method of claim 15 wherein the attenuation system comprises a diffraction grating.

19. The method of claim 15 wherein the attenuation system comprises a diffuse reflection coating.

20. The method of claim 15 wherein the attenuation system comprises an absorbing coating.

* * * * *